Sept. 30, 1924.
R. C. CAUGHEY
1,509,826
AGRICULTURAL IMPLEMENT FRAME
Filed March 9, 1922    3 Sheets-Sheet 1
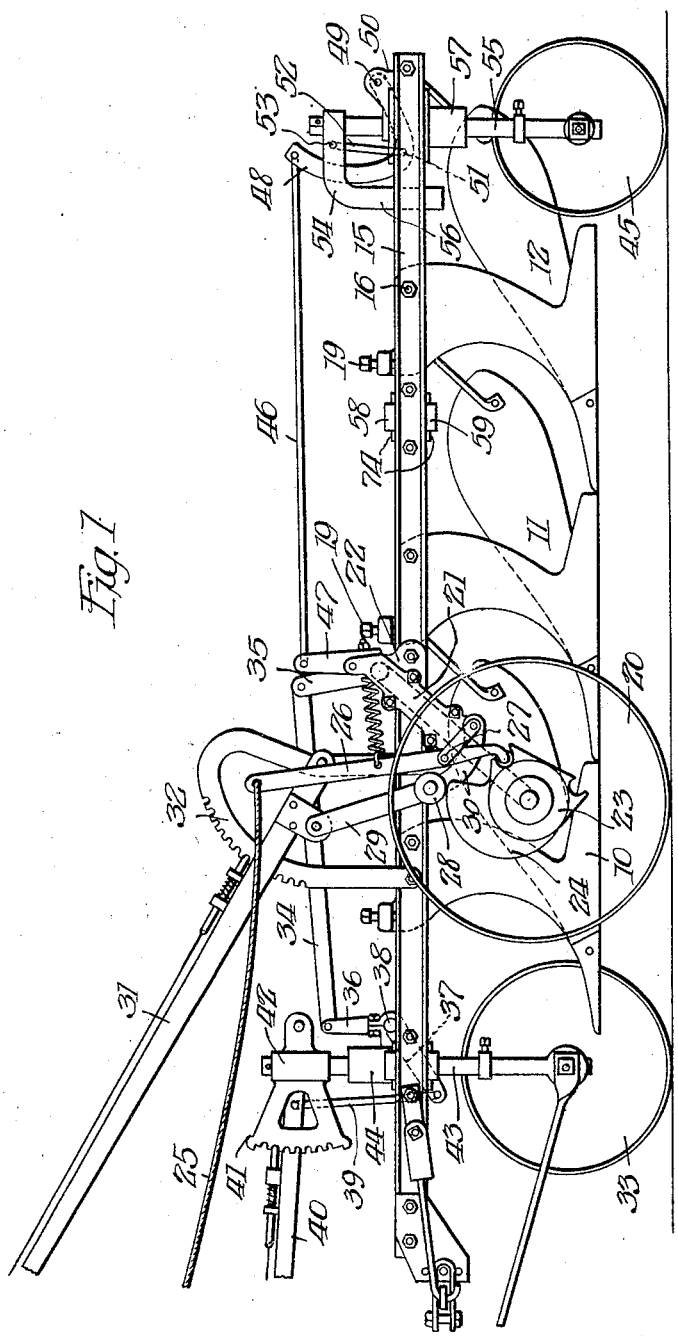

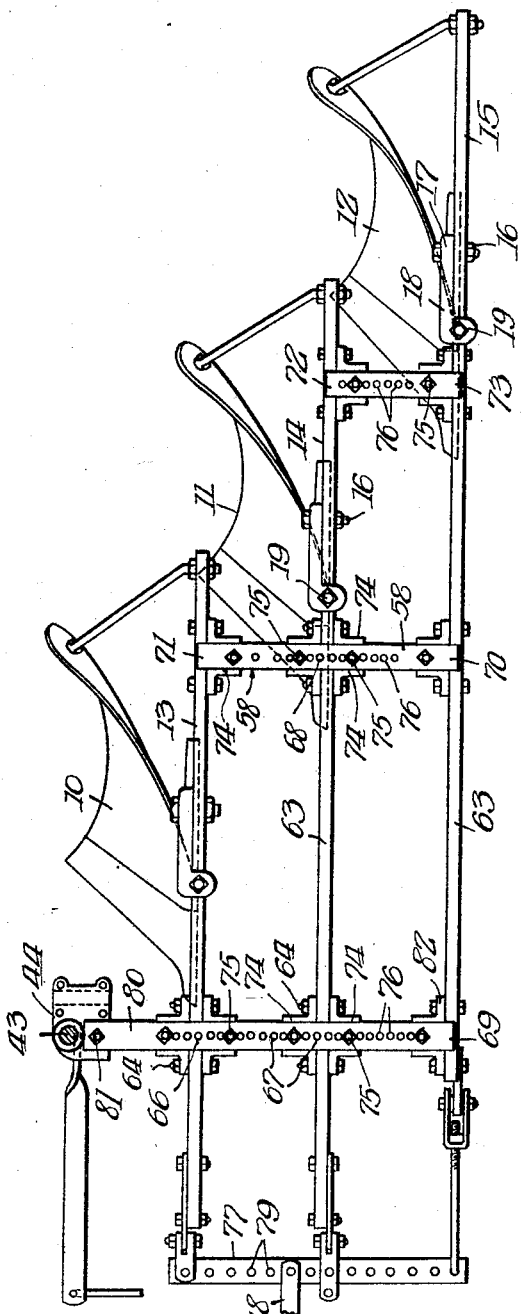

Sept. 30, 1924.  1,509,826
R. C. CAUGHEY
AGRICULTURAL IMPLEMENT FRAME
Filed March 9, 1922    3 Sheets-Sheet 3
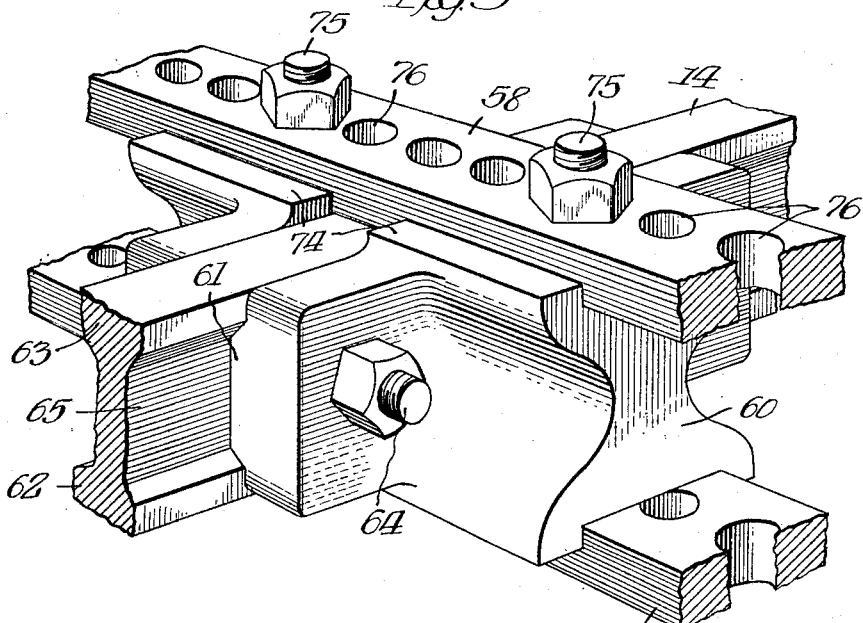
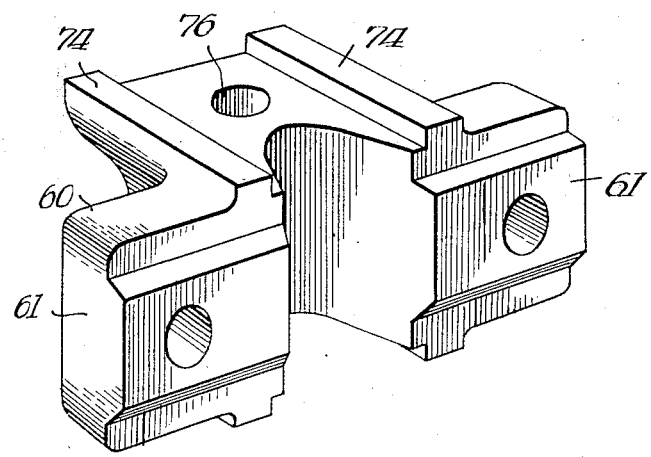
Inventor:
Robert C. Caughey
By Fisher Towle Clapp & Soans
Attys.

Patented Sept. 30, 1924.

1,509,826

UNITED STATES PATENT OFFICE.

ROBERT C. CAUGHEY, OF DIXON, ILLINOIS, ASSIGNOR TO J. I. CASE THRESHING MACHINE COMPANY, OF RACINE, WISCONSIN, A CORPORATION OF WISCONSIN.

AGRICULTURAL-IMPLEMENT FRAME.

Application filed March 9, 1922. Serial No. 542,201.

*To all whom it may concern:*

Be it known that I, ROBERT C. CAUGHEY, a citizen of the United States, residing at Dixon, in the county of Lee and State of Illinois, have invented certain new and useful Improvements in Agricultural Implement Frames, of which the following is a specification.

My invention relates to improvements in agricultural implement frames, and is of particular value in connection with frames for supporting a plurality of plow bottoms or other earth-turning bodies.

The principal objects of the invention are to provide an implement frame having a plurality of laterally spaced beams which are capable of adjustment to vary the spacing between them in order to accommodate bottoms of different widths; to provide a construction which may be built up of ordinary mill stock, such as rolled shapes or bars, without the necessity of performing troublesome and costly forging operations; to provide a construction which may be quickly and conveniently adjusted to accommodate bottoms of different spacing—to provide a construction which shall be simple in design and economical to manufacture, and in general to provide a rugged and efficient structure of the character referred to.

In the drawings, which illustrate my invention as applied to a structure plow equipped with three bottoms, Fig. 1 is an elevation of the plow;

Fig. 2 is a plan view of the frame and bottoms, the lifting mechanism being removed for the purpose of clearness;

Fig. 3 is an enlarged perspective view of the adjustable connecting means, and

Fig. 4 is an enlarged perspective view of one of the junction blocks.

Referring to the drawings, it will be seen that the bottoms 10, 11 and 12 are respectively supported on plow beams 13, 14 and 15. The supporting connection between the bottoms and the plow beams is secured through a bolt 16 extending through a standard 17 having an upwardly projecting arm 18 with a lug overlying the plow beam through which lug extends an adjustable set screw 19 by means of which set screw the bottom may be levelled. The land wheel 20 is rotatably supported on a crank axle 21, the upper end of which is rotatably mounted in bearing brackets as at 22 bolted to the plow frame. The automatic raising and lowering of the plow frame, with reference to the wheels of the plow is effected by swinging the crank axle 21 in its bearings, such swinging movement being accomplished by the rotary movement of land wheel 20 as the plow is dragged over the ground by the tractor. Such automatic lifting and lowering mechanism is fully described in U. S. patent to H. S. Smith 1,394,767, issued Oct. 25, 1921, and therefore, I will not attempt to make a detailed description of such mechanism.

In general, the lifting apparatus is operated through a clutch 23 which is adapted at the will of the operator, to establish a driving connection between land wheel 20 and cam 24. When the operator of the tractor pulls trip cord 25, trip lever 26, which is pivoted on crank arm 21 at pawl joint 27, trips the clutch and causes cam 24 to revolve with wheel 20 cooperating with cam roll 28 and toggle links 29 and 30. The upper end of link 29 is pivoted to a lug on hand lever 31 which is capable of adjustment on tooth quadrant 32 fixed to the frame of the plow.

The front end of the plow frame is raised or lowered relatively to the front furrow wheel 33 by means of a link 34, having its rear end connected to an upstanding arm 35 moving with crank axle 21 and having its front end connected to the upper end of the upstanding arm of a bell crank 37 pivoted on fixed pin 38. The forward end of bell crank 37 is connected by means of a link 39 to a point on hand lever 40 which is adjustably mounted with respect to sector 41. Sector 41 is made with a hub 42 secured to the upper end of a standard 43 on the lower end of which the furrow wheel 33 is rotatably mounted. Stem or standard 43 is arranged to slide in a bracket 44 rigidly secured to a part of the plow frame.

The rear end of the plow is raised and lowered with reference to rear furrow wheel 45 by means of rearwardly extending link 46, the front end of which is pivotally connected to the upper end of an arm 47 swinging with crank axle 21, the rear end of said link 46 being pivotally connected to the upper arm of bell crank 48. The end of the lower arm of bell crank 48 is pivoted on a pin 49 mounted in a lug 50 secured to the end of plow beam 15. The intermediate point 51 of bell crank 48 is hung by means of a link 52 to a point 53 on an L-shaped bracket 54, the rear end of which is secured on the upper end of wheel stem or standard 55, while the front or depending end 56 is arranged to slide vertically with respect to plow beam 15. The rear furrow wheel 45 is rotatably mounted on the lower end of standard 55 which is arranged to slide vertically in a bracket 57 bolted to the plow beam 15.

The plow beams 13, 14 and 15 are maintained in proper spaced relation by means of a set of connecting members extending horizontally and transversely across the line of draft and to which the plow beams are adjustably secured for the purpose of varying the spacing of the beams. In the present instance, said transverse connecting bars comprise three pairs of flat bars, each bar comprising an upper bar 58 and a lower bar 59 extending respectively over and under the plow beams. Said connecting or spacing bars 58 and 59 are secured to the plow beam, for instance plow beam 14, by means of junction members or blocks 60. Each of said junction blocks 60 comprises preferably a casting having a vertically extending face fitting the side of the plow beam and having a pair of horizontally extending upper and lower faces to which the connecting bars 58 and 59 are applied. As in the present instance, the plow beams are of I cross section, the vertical face of junction block 60 is made with a raised formation as at 61 fitting between the flanges 62 and 63 of the plow beam, thereby forming in effect an interlocking engagement between the side of the beam and the side of the junction block 60, when junction block 60 is clamped to the side of the beam. Such clamping is effected by means of a pair of bolts as at 64 extending through registering apertures in the junction block and beam web 65. It will be observed that at points 66, 67 and 68, where the spacing bars extend beyond or on either side of the plow beams, the junction blocks 60 are arranged in pairs, bolts 64 being longer than at points 69, 70, 71, 72 and 73, where only a single junction block is employed.

The junction blocks 60 are permanently bolted to the sides of the plow beams 13, 14 and 15, and are of slightly greater vertical height or thickness than the vertical depth of the plow beams so that the spacing connecting bars as at 58 and 59 can extend over and under the plow beams while at the same time being supported by the upper and lower faces of the junction block. As shown, the said upper and lower faces of the junction block 60 is formed with transversely extending flanges as at 74 spaced apart the proper distance to form in effect a groove or channel of the same width as spacing bar 58 and thereby snugly receive and guide the latter.

The lateral lug or extension of block 60 which forms guiding grooves at the upper and lower faces of the junction block is of such length that the spacing bar 58 is adequately supported against fore and aft racking action of the respective plow beams. Bars 58 and 59 are rigidly but adjustably secured in the guiding grooves of the junction block by means of bolts 75 extending through apertures 76 in the junction block and also through spaced apertures as at 76 punched through and along the center line of the spacing bars at points properly spaced to provide the required adjustability. Inasmuch as it is rarely necessary to provide for a change of space of less than one inch, said apertures, at points 72, 68 and 67, can be one inch apart, while at points 71 and 76, they may be on two inch centers.

In the particular plow herein shown, the draft is applied to the plow through a cross bar 77 to which is connected the hitch bar 78, said cross bar 77 being made with a plurality of apertures 79, by which the position of hitch bar 78 may be regulated. It will be observed also that the bracket 44, which supports front furrow wheel stem 43 is mounted on the laterally extended ends 80 of the front pair of connecting spacing bars by means of bolt 81. In view of the fact that bracket 44 is operatively connected with the crank axle 21, which axle is mounted in bracket 22, permanently fixed to plow bottom 15, it is desirable to maintain the relative position of bracket 44 and plow beam 15, hence the opposite ends of the front pair of spacing bars 80 are permanently bolted or secured respectively to brackets 44 and junction block 82.

The described details of construction and operation are merely illustrative of a single phase of my invention. It will be understood that the scope of same should be determined by reference to the appended claims, said claims being construed as broadly as possible, consistent with the state of the art.

I claim:

1. In an agricultural implement frame, the combination of a pair of transversely extending frame members, a pair of laterally spaced junction blocks clamped between and adjustable along said members, and an earth-turning-body supporting beam clamped between the blocks.

2. In an agricultural implement frame, the combination of a series of parallel earth-turning-body supporting beams of successively shorter length extending longitudinally of the line of draft, a series of cross bars of successively shorter length overlying and underlying the beams, and junction blocks adjustably connecting the cross bars and beams for varying the separation of the latter.

3. In an agricultural implement, the combination of a frame comprising a plurality of laterally spaced earth-turning-body supporting beams, cross bars adjustably connecting the beams for varying the separation of the latter, a transverse shaft journaled on the frame and provided with a depending portion carrying a supporting wheel, means for oscillating the shaft to regulate the elevation of the frame, a plurality of auxiliary supporting wheels arranged respectively at the front and rear of the shaft and at opposite sides of the frame, and links connecting said shaft with the auxiliary supporting wheels for adjusting same simultaneously with the first mentioned supporting wheel.

4. In an agricultural implement frame the combination of a plurality of bottom-supporting beams extending longitudinally of the line of draft in parallel spaced relation, a junction block secured to the side of one of said beams and a pair of spacing bars connected to one of the other beams respectively extending over and under the junction block and secured thereto.

5. In an agricultural implement frame the combination of a plurality of bottom-supporting beams extending longitudinally of the line of draft in parallel spaced relation, a junction block secured to the side of one of said beams and a pair of spacing bars connected to one of the other beams respectively extending over and under the junction block and secured thereto, the arrangement including means for effecting relative adjustment of the junction block with respect to both of said bars.

6. In a plural beam plow, the combination of a beam, a junction block bolted to the side of said beam, and a pair of spacing bars connected to another beam vertically spaced apart by the junction block and bolted thereto.

7. In a plural beam plow frame, the combination of a junction block secured to the side of one of said beams and interlocked therewith and provided with an open-sided horizontal guideway and a spacing bar of uniform cross section secured to another of the beams longitudinally adjustable in said guideway and bolted to said block.

8. In a plural beam plow frame, the combination of a plow beam of I cross section, a junction block secured to the side of said beam and having a projecting portion interlocking with the side of the beam and having a transversely extending pair of spaced formations extending above the beam and forming a guideway and a spacing bar of substantially uniform cross section fitting between said formations and boltable to the junction block in a plurality of different positions of longitudinal adjustment.

9. In a plural beam plow frame, the combination of a plow beam of I cross section, a junction block interlocked with and bolted to the side of said beam and having upper and lower faces provided with pairs of transversely spaced flanges extending respectively above and below the top and bottom surfaces of the plow beam and upper and lower spacing bars of substantially uniform cross section respectively fitting between the upper pair and lower pair of flanges, said pairs extending above and below the plow beam and being boltable to the junction block in a plurality of different positions of longitudinal adjustment relative to the junction block.

ROBERT C. CAUGHEY.